M. L. Gorham,
Seed Dropper.

No. 93,529. Patented Aug. 10, 1869.

Witnesses
Jacob Behel
Joseph G. Lyford

M. L. Gorham

UNITED STATES PATENT OFFICE.

M. L. GORHAM, OF ROCKFORD, ILLINOIS.

IMPROVEMENT IN SEEDING-MACHINES.

Specification forming part of Letters Patent No. 93,529, dated August 10, 1869.

*To all whom it may concern:*

Be it known that I, M. L. GORHAM, of the city of Rockford, in the county of Winnebago and State of Illinois, have invented certain new and useful Improvements in Seeding-Machines; and I do hereby declare that the following is a full, clear, and exact description thereof, reference being had to the accompanying drawings making part of this specification, in which—

Figure 1:
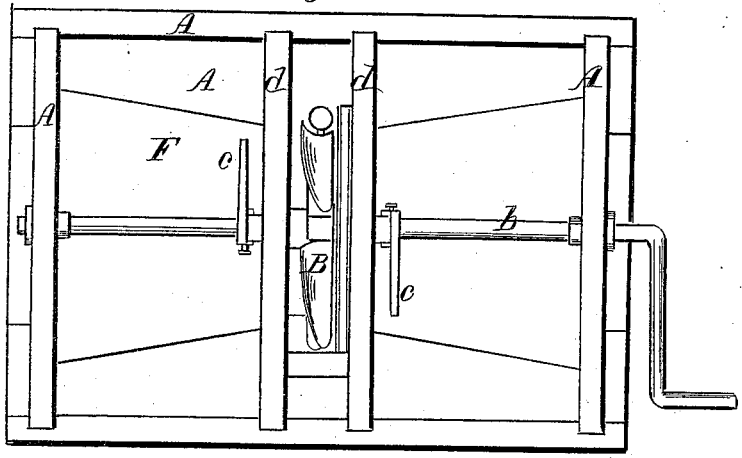
Figure 4:
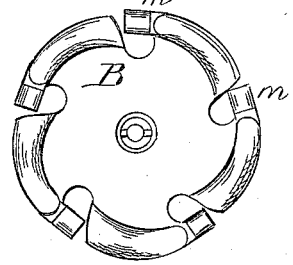
Figure 2:
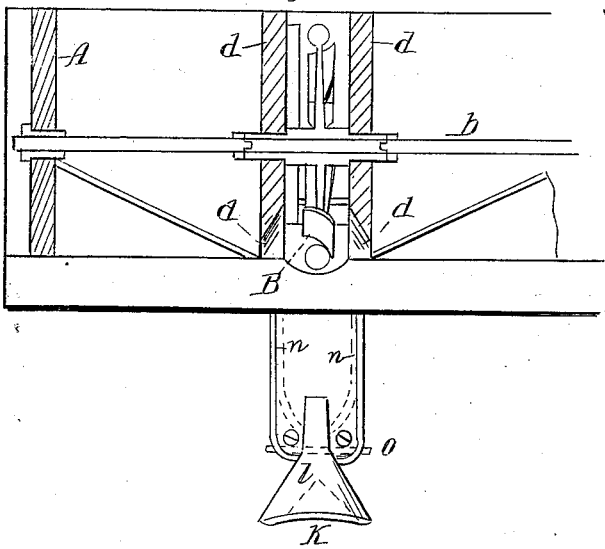
Figure 3:
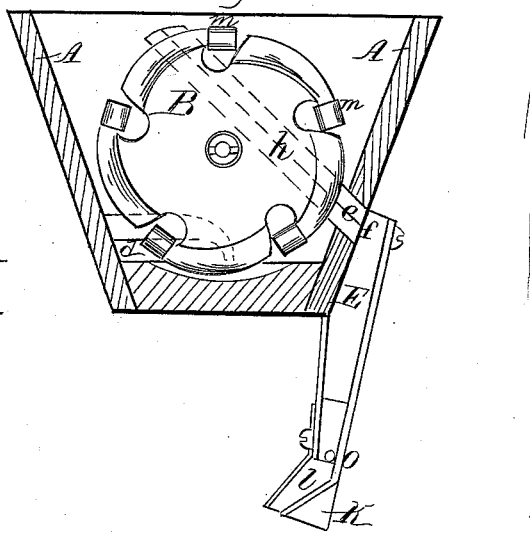

Figure 1 is a top view with the cover removed. Fig. 2 is a longitudinal vertical section. Fig. 3 is a transverse vertical section. Fig. 4 is a side view of the seed-distributing wheel.

Similar letters of reference indicate corresponding parts in the different figures.

Whereas machines have been desired and used for sowing seeds of different kinds, and which are supported upon wheels, with seed-box and seed-distributing wheels placed within the seed-box, between partitions, with scatterers, and in some instances with drag-teeth attached; and whereas Letters Patent No. 32,992, dated the 6th day of August, 1861, were issued to me for improved seeding-machines of the class described; now, the object of the invention which constitutes the subject-matter of this patent is to improve those machines; and relates to the parts immediately connected with the distribution of the seed.

In the drawings in this case I have only represented a portion of the seed-box, composed of one section, with seed-distributing wheel and scatterer.

In Figs. 1, 2, and 3, A represents the seed-box, in which are placed transversely vertical partitions *a a* forming an inclosure, in which is placed the wheel B, with bearings extending through partitions *a a*, the ends of which are clutched to receive the stirrers *c*, which are also clutched to fit into the ends of the hub of wheel B, and secured to shaft by set-screws or otherwise. Underneath the partitions *a a* are openings *d d* to admit the seed from the seed-box to the seed-distributing wheel. There is also an opening, *e*, in side of seed-box, between the partitions *a a*, as at *f*, in which terminates the trough *h*, and through which the seed is discharged into the spout E, which is provided with a semi-conic scatterer, *k*, at its lower end, and is covered with a hood, *l*. F represents inclined bottoms in seed-box A, for the purpose of conducting the seed to the openings *d*. The wheel B is provided with cups upon its periphery, and receives its motion through the medium of shaft *b*, which is connected by tooth-gearing to a driving toothed wheel secured to one of the carrying-wheels upon which the apparatus is supported.

The first part of my invention consists of a seed-distributing wheel, B, provided with seed-cups *m*, placed upon the periphery thereof, and tangential thereto, and the portion of the periphery between the seed-cups is beveled on one side only, for the purpose of deflecting the seed as it falls from the cups all upon one side thereof, and into the trough *f*, which is placed upon the partition *a*, as at *h*.

It is obvious that these wheels may be constructed with that portion of their periphery between the seed-cups beveled alternately on opposite sides, so as to discharge the seed from each alternate cup into troughs provided upon partitions *a a* to receive it, for the purpose of sowing in close drill.

The second part of my invention consists in constructing the ends of the hubs of seeding-wheel B, which extend through partitions *a a*, with clutched prominences or recesses to receive the stirrers *c c*, which are also clutched to fit into the ends thereof, and are secured to the shaft *b* by set-screws or otherwise, by means of which the wheel B is made to rotate with the shaft. These stirrers *c c* also serve to agitate the seed in seed-box A, and insure its passage through openings *d* to the seed-distributing wheel B. To the side of seed-box A, and over the opening *e*, extending downward, is secured the spout E, the edge plates of which, near their lower end, are bent at an angle inward, as represented in dotted lines *n*, by means of which the seed will be thrown upon the apex of the semi-conic scatterer *k*, Fig. 3, and dotted lines, Fig. 2, which embodies the third part of my invention.

The fourth part of my invention consists in providing the scatterer E with a hollow semi-conic formed hood, *l*, secured to spout E, covering cone *k*, for the double purpose of preventing the unequal bounding of the seed from the cone-scatterer k, and to prevent the wind from blowing the seed from any side of the cone.

To enable me to sow all kinds of seeds, and distribute them equally upon the ground, I have provided the spout E with a pin, o, passing through the neck thereof above the cone-scatterers, as at o, Figs. 1 and 2, and to be used in sowing certain kinds of seeds, and when in use will break the force of the falling seed, and cause it to strike the cone further from its apex, and lessen the throw of the falling seed.

Having described my invention, what I claim, and desire to secure by Letters Patent, is—

1. A seed-distributing wheel, B, with that portion of its periphery between the seed-cups beveled upon one side, for the purpose set forth.

2. A seeding-wheel, B, constructed with hub ends clutched to receive clutched stirrers secured to shaft b, as and for the purpose set forth.

3. Spout E and trough h, in combination with seed-distributing wheel B, as and for the purpose set forth.

4. The hood l and pin o in spout E, as and for the purpose set forth.

M. L. GORHAM.

Witnesses:
JACOB BEHEL,
JOSEPH G. LYFORD.